United States Patent
Matsuura

Patent No.: US 6,873,429 B2
Date of Patent: Mar. 29, 2005

(54) SCANNING DEVICE

(75) Inventor: Hideki Matsuura, Tokyo (JP)

(73) Assignee: NEC Corporation, Tokyo (JP)

(*) Notice: Subject to any disclaimer, the term of this patent is extended or adjusted under 35 U.S.C. 154(b) by 589 days.

(21) Appl. No.: 09/730,004

(22) Filed: Dec. 6, 2000

(65) Prior Publication Data
US 2001/0021945 A1 Sep. 13, 2001

(30) Foreign Application Priority Data
Dec. 8, 1999 (JP) .......................... 11-349410

(51) Int. Cl.⁷ .................. B41B 15/00; H04M 11/00
(52) U.S. Cl. .................. 358/1.15; 358/468; 358/474; 358/436; 379/100.1; 710/8
(58) Field of Search ...................... 358/474, 1.15, 358/442, 468, 473, 471, 436, 434, 402; 700/28; 379/100.01; 710/8

(56) References Cited

U.S. PATENT DOCUMENTS 6,208,426 B1 * 3/2001 Saito et al. .................. 358/1.15
6,208,436 B1 * 3/2001 Cunningham ............... 358/474
6,256,662 B1 * 7/2001 Lo et al. ...................... 709/203
6,429,952 B1 * 8/2002 Olbricht ...................... 358/442
2002/0004802 A1   1/2002 Shima

* cited by examiner

Primary Examiner—Edward Coles
Assistant Examiner—Jason Sherrill
(74) Attorney, Agent, or Firm—Foley and Lardner LLP

(57) ABSTRACT

The scanning device includes a reading unit for reading texts, a display unit for controlling an operation panel, a network controlling unit for controlling a network function connected to a local area network, a mail function unit, an HTTP function unit, and a device controlling unit. The mail function unit realizes a mail sending function by using the network controlling unit. The HTTP function unit, using an HTTP protocol, sends and receives such information as resolution for reading texts, paper size, encoding system, button names which are information for distinguishing the texts, and computer address information by using the network controlling unit. The device controlling unit controls the reading unit, the mail function unit, and the HTTP function unit and includes a data storage unit which stores information assigned by a computer and image files read by the reading unit.

7 Claims, 3 Drawing Sheets

| METHOD | POST |
|---|---|
| PARAMETERS ADDED | EXAMPLE:<br>b_regist=REGIST&ipaddr=10.42.34.145&button=ACT<br>&resolution=fine&contrast=3&scanarea=aA4&coding=MMR |

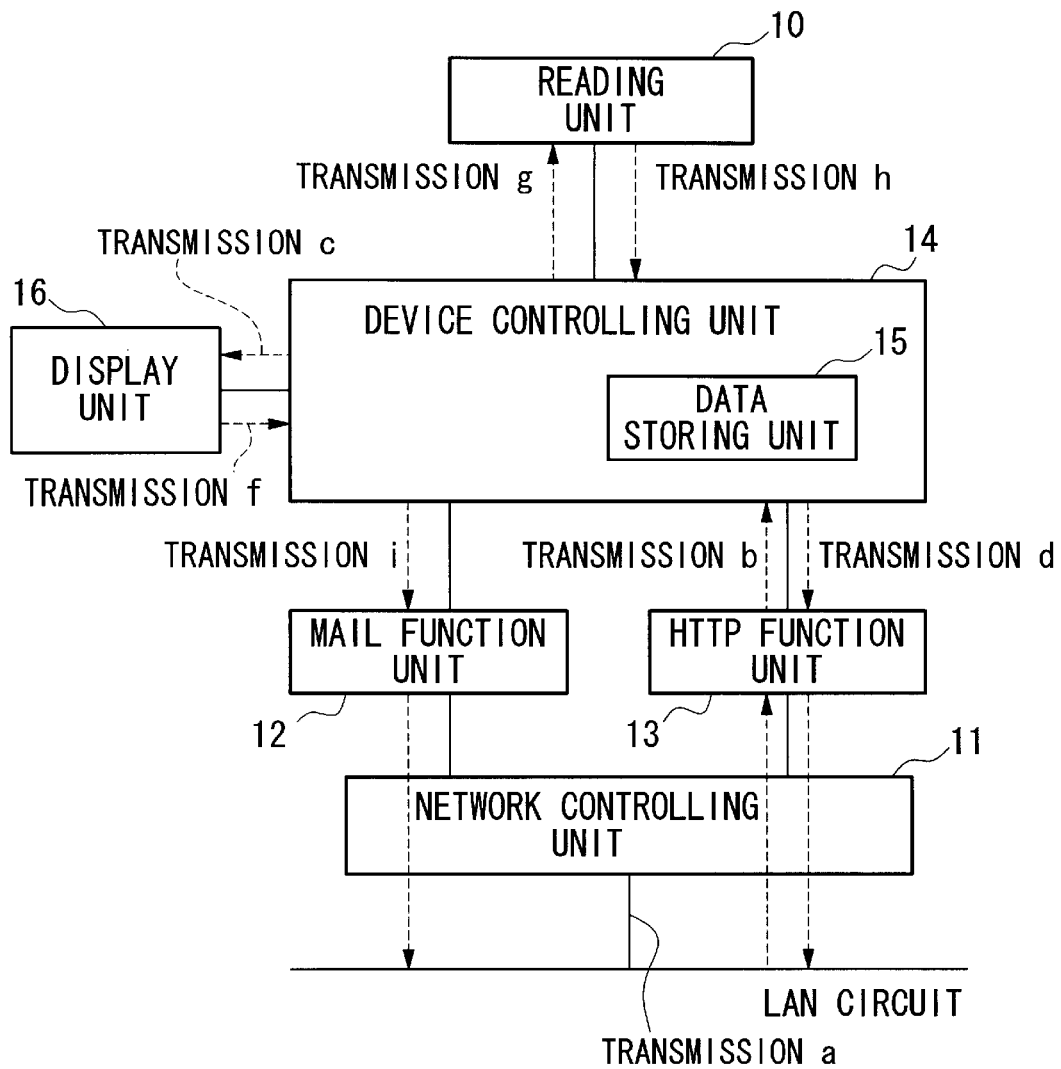
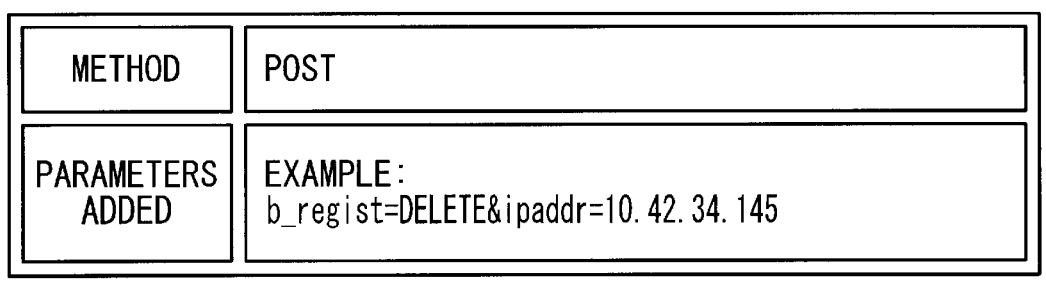

SCANNING DEVICE

BACKGROUND OF THE INVENTION

1. Field of the Invention

The present invention relates to a scanning device. More specifically, the present invention relates to scanning devices capable of reading an image via a computer network.

2. Description of Related Art

In general, it is required to pre-register an address of a computer so that data read by a device having a scanning function can be sent to the computer connected to a local area network (LAN). For this reason, it is necessary to input address information for the computer into the scanning device in advance. Also, when parameters relating to reading an image, such as paper size and resolution, are input into a scanning device which operates in a conventional manner, the operator of the scanning device needs to confirm the parameters each time in order to obtain preferred parameters. These have been obstacles for efficiently using the device.

In order to solve these problems, a technique relating to a network scanner in which image data may be directly sent to a client personal computer (PC) from the network scanner without using a file server is disclosed in, for example, Japanese Unexamined Patent Application, First Publication No. 10-308840. The disclosed scanning device includes an image inputting means, a network connecting means through which PCs send and receive data via a network, and a control means capable of exchanging data between the image inputting means and the network connecting means. The control means is a network scanner having an input controlling means, a storage means, and a transmission control means. The input controlling means controls the image inputting means according to parameters for reading an image. The storage means temporally stores an image data. The transmission control means is capable of sending the image data to the address of a client PC. Although the network scanner is capable of receiving addresses or parameters for reading images from client PCs and sending the image data read to a browser of a client PC, it is shared with difficulty by a plurality of client PCs. The first reason for this is that it is not capable of receiving data from client PCs in parallel. Also, it takes time for the input controlling means to carry out a procedure in which parameters for reading images are set to control the image input means. Moreover, the use of the scanning device is devoted to one client PC for a long time during a period in which addresses and parameters for reading images are received from a client PC and the image data read are sent to the client PC or, when the connection to the client PC is not good, the image data are transferred to the file server. Accordingly, the scanning device does not have a real multi-user function by which a plurality of users can use the device at the same time and, as a result, its efficiency is not very good.

SUMMARY OF THE INVENTION

The present invention provides a scanning device having a mail client function and a scanner function. The scanning device also has a function by which parameters, such as IP address information for a computer, reading resolution, paper size, name of buttons, and encoding system, are received from a computer connected via a network and image data read by a reading unit of the scanning device are transformed into a file having a resolution, encoding system, and paper size commanded by the computer. The file is attached to mail to be sent to an IP address ordered by the computer. In addition, the scanning device may be used by a computer receiving the mail if information required is attached to a mail header by the computer sending the mail. Especially, the present invention provides a scanning device which realizes parallel receiving/sending of data from/to a plurality of computers via a network.

In accordance with an embodiment of the invention, a scanning device is connected to a network, which includes a device which receives an IP address and a plurality of parameters for reading and encoding an image from a computer connected to the network; and a device which sends to the IP address mail with an attached file of the read image.

In another embodiment there is provided a scanning device including a reading unit for reading texts; a display unit for controlling an operation panel; a network controlling unit which is connected to a network for sending/receiving data; an HTTP function unit for sending/receiving notification information including information relating to a text to be read, an encoding system for image data of the text read, and an IP address of a computer connected to the network using an HTTP protocol via the network controlling unit; a mail function unit for sending information relating to the text and image data read as mail to the IP address using a SMTP protocol via the network controlling unit; and a device controlling unit for controlling the reading unit, the mail function unit, and the HTTP function unit, the device controlling unit including a data storage unit for storing the notification information and image data read by the reading unit.

In the scanning device, information relating to the text includes reading resolution, size of paper used for reading, and the type of the text.

Further in the scanning device information about the type of text, among information relating to the text which is sent as mail by the mail function unit via the network controlling unit, is positioned at a header portion of the mail.

In the scanning device, information displayed on the display unit is deleted by receiving a command from the computer which has sent the IP address and a plurality of parameters.

In the scanning device, the display unit is capable of displaying at least types of a plurality of texts reported by a plurality of computers having different IP addresses and a reading process of each of the texts is started when an operator of the scanning device pushes a corresponding displayed portion on the display unit.

In the scanning devices according to claim 6, wherein the device controlling unit, after the corresponding displayed portion on the display unit showing a type of text is pushed, notifies the reading unit of a set of information about the text, including the type thereof, indicated by the displayed portion being pushed among a plurality of sets of information about the plurality of texts being stored in the data storage unit.

According to the above-mentioned scanning device of the present invention, since IP addresses and reading options (parameters) such as reading resolution, reading size, and encoding system may be determined by each of a plurality of computers operating in parallel when the scanning device of the present invention is used, it becomes unnecessary to pre-register a destination of read image data with a main body of the scanning device and, hence, troublesome operation for a registration process and a memory area for the destination becomes unnecessary. Also, since options for a reading operation may be determined from a computer side, each operator can always use a constant option to operate the scanning device.

Moreover, since input operations may be carried out in parallel, the time for occupying the scanner device may be reduced by an option input using a main panel of the scanning device. Accordingly, the procedure is speeded up and the device is used more efficiently.

Further, since this is a sending procedure of image data by means of a mail document, SMTP is used as a communication protocol and, unlike an HTTP protocol which requires an access from a computer, it is possible to voluntarily send information from the scanning device side. For this reason, the time required for a computer to occupy the use of the scanning device for communication becomes short and, therefore, it does not happen that a certain computer uses the device for a long time beginning from transmission A to the sending of image data including the time required for reading the image data. Accordingly, the use of the same scanning device may be shared by a plurality of users.

Finally, since the scanning device is provided with a button name assigned by a computer and the button name is sent to the computer as a mail header from the scanning device, it may be utilized by the computer. Accordingly, it is possible, for instance, to automatically sort mail from the scanning device by installing a tool for analyzing a mail header of each piece of mail and creating folders for each button name in the computer.

BRIEF DESCRIPTION OF THE DRAWING

FIG. 3 is a diagram showing the structure of the embodiment of the scanning device according to the present invention with the directions of signals associated with each unit of the device.

FIG. 5 shows another example of how an HTTP signal may be used in the embodiment according to the present invention.

DETAILED DESCRIPTION OF THE INVENTION

Figure 1:
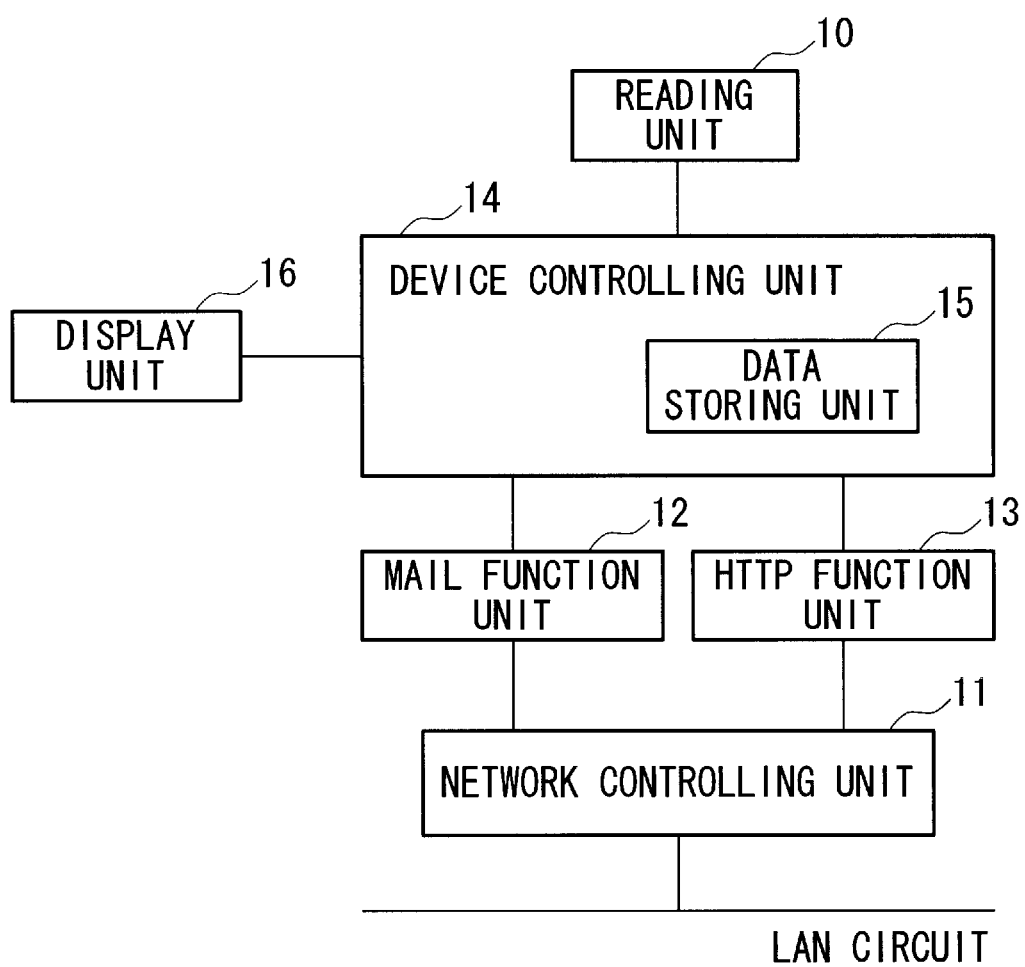
FIG. 1 is a block diagram for explaining the structure of an embodiment of the scanning device according to the present invention.

Hereinafter, embodiments of the present invention will be described in detail with reference to the attached drawings. FIG. 1 shows a structure of the scanning device according to the present invention.

The scanning device according to the present invention includes a reading unit 10, a display unit 16, a network controlling unit 11, a mail function unit 12, an HTTP function unit 13, and a device controlling unit 14. The reading unit 10 reads texts. The display unit 16 controls an operation panel. The network controlling unit 11 controls a network function connected to a LAN. The mail function unit 12 realizes a mail sending function by using the network controlling unit 11. By using the network controlling unit 11, the HTTP function unit 13, using an HTTP protocol, sends and receives such information as resolution for reading texts, paper size, encoding system, button names which are information for distinguishing the texts, and computer address information. The device controlling unit 14 controls the reading unit 10, the mail function unit 12, and the HTTP function unit 13 and includes a data storage unit 15 which stores information assigned by a computer and image files read by the reading unit 10.

Next, the operation of the present embodiment in its entirety will be described in detail with reference to FIGS. 2 and 3. It is assumed that the scanning device of the present invention and a computer are connected to a LAN via an Ethernet.

First, the operation for registering a scanner button A from a computer will be explained.

It is not particularly necessary to install a scanner driver (TWAIN driver) in the computer. Also, as shown in FIG. 2, parameters such as the IP address of a computer, reading resolution, encoding system, paper size, and button names are directly transmitted, as a POST command, to the scanning device by transmission A using the HTTP protocol without depending on procedures such as an acquirement of HTML files for setting parameters from the scanning device. The computer then enters a waiting status and waits for a response (i.e., transmission B) from the scanning device. For this reason, the time required for the computer to use the scanning device is reduced and, hence, the scanning device may be shared by a number of computers.

The scanning device, on the other hand, analyzes transmission a (refer to FIG. 3) which is transmitted via the HTTP function unit 13 and parameters such as an IP address of the computer sending the information, reading resolution, encoding system, paper size, and button names and transmits the result (transmission b in FIG. 3) to the device controlling unit 14 through the network controlling unit 11 under the control of the HTTP function unit 13. The device controlling unit 14 determines whether to accept the communication taking into account the results of a validity check of the informed parameters and the state of the device.

If it is acceptable, the device controlling unit 14 stores the parameters sent from the HTTP function unit 13 in the data storage unit 15 and enters a waiting status and waits for reading. The device controlling unit 14 sends commands so that the button A corresponding to the button name sent by the computer is shown on the display unit 16 (transmission c) and informs the HTTP function unit 13 that it is ready for receiving the information (transmission d). The HTTP function unit 13 informs (transmission e) the computer via the network controlling unit 11 that the information will be readily accepted.

During this period, the scanning device may receive communications from a plurality of computers. If it is ready to receive the communications, the name of each button indicated by each computer will be displayed on the display unit 16. The display unit 16 has a screen such as a liquid crystal panel and it is capable of showing a plurality of buttons corresponding to a plurality of communications.

When it is not ready to receive communications, the device controlling unit 14 informs the HTTP function unit 13 that it cannot receive communications and enters an idle state. The HTTP function unit 13 informs (transmission e) the computer that it is not ready to receive communications via the network controlling unit 11.

Figures 2, 4:
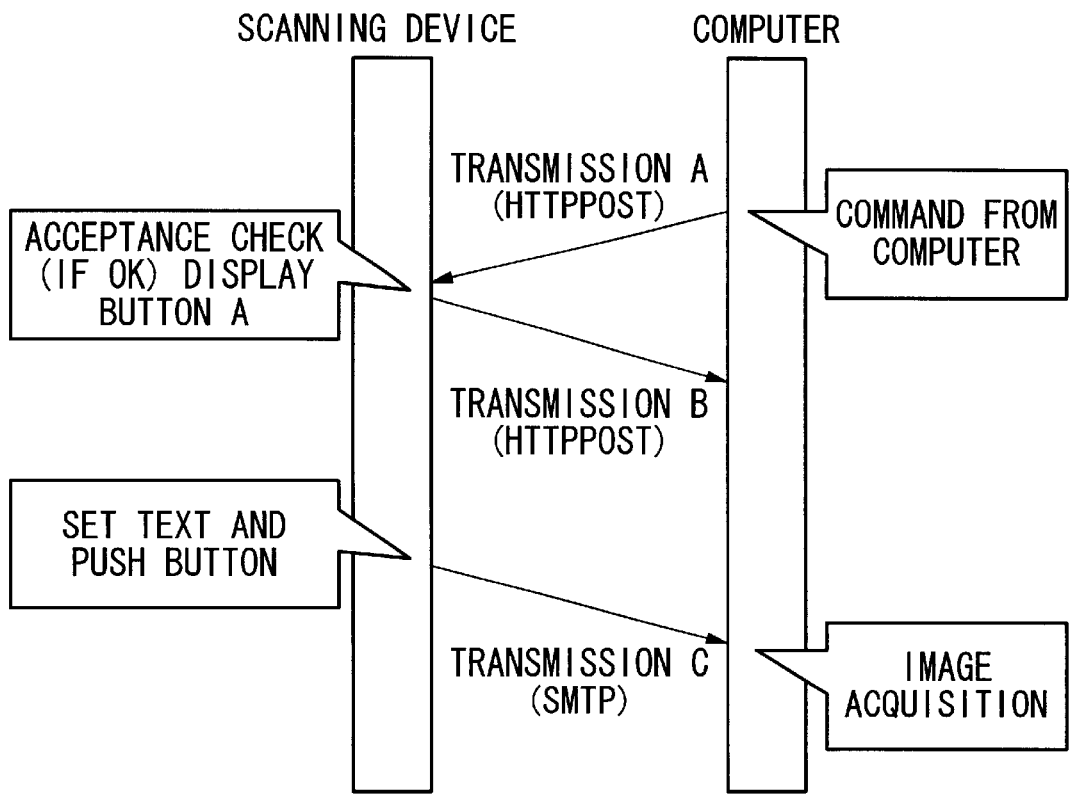
FIG. 2 is a diagram showing a communication sequence between the embodiment of the scanning device according to the present invention and a computer device.
FIG. 4 shows an example of how an HTTP signal may be used in the embodiment according to the present invention.

An example of a parameter used during an operation for registering a scanner button using a POST command is shown in FIG. 4. In the example shown in FIG. 4, the mailing address is 10.42.34.145, the button name is "Act", the scan area (reading paper size) is "A4", the resolution (i.e., the reading resolution) is "fine", and the encoding (i.e., encoding system) is "MMR". Also, "b_regist=REGIST" indicates an assignment of a button registration.

When the device is ready to receive information, an operator inputs text into a reading tray and pushes button A, which is indicated on the display unit 16 and required by the computer to start the operation (transmission f).

The device controlling unit 14 transmits parameters stored in the data storage unit 15 to the reading unit 10 (transmission g). Since there is a possibility that transmission A shown in FIG. 2 is sent by a plurality of computers, the device controlling unit 14 informs the reading unit 10 of a set of parameters matched with the name of the button pushed. The reading unit 10 reads the text in accordance with the reading resolution, the reading paper size, and the encoding system indicated by the parameters received from the device controlling unit 14. The image data read are transferred to the device controlling unit 14 by means of Transmission h. The image data are stored in the device controlling unit 14 according to pre-indicated parameters, i.e., the resolution of the setting "fine" and the encoding system of MMR.

The device controlling unit 14 sends a pre-indicated IP address and image data from the data storage unit 15 (transmission i) to the mail function unit 12. The mail function unit 12 attaches the reported image data to the mail as an attached file and further adds the type of the file to a mail header to send the mail via the network controlling unit 11 (transmission j). As shown in FIG. 2, the mail is sent (SMTP) by transmission C.

Transmission C, shown in FIG. 2, is a mail document which is being send to a computer from the device of the present invention. Since this is a sending procedure of image data by means of a mail document, SMTP is used as a communication protocol and, unlike an HTTP protocol which requires an access from a computer, it is possible to voluntarily send information from the scanning device side. For this reason, the computer uses the scanning device for communication only between transmission A and transmission B as shown in FIG. 2 and, therefore, it does not happen that a certain computer uses the device for a long time beginning from transmission A to the sending of image data including the time required for reading the image data. Accordingly, the same scanning device may be shared by a plurality of users.

Also, it becomes possible for the computer side to classify received mail by sorting according to the button name attached to the mail header thereof.

Next, an operation for deleting the button A displayed on the display unit 16 will be described.

A command for deletion from a computer is transmitted to the HTTP function unit 13 via the network controlling unit 11 using an HTTP protocol (transmission a). The HTTP function unit 13 sends the deletion command (transmission b) to the device controlling unit 14. The device controlling unit 14 then performs an operation for deleting data corresponding to informed IP addresses from the data storage unit 15 and sends transmission d to the HTTP function unit 13. The HTTP function unit 13 informs the computer on the other side about the deletion by means of transmission e. An example of the parameters which may be used for an operation for button deletion using the POST command is shown in FIG. 5.

What is claimed is:

1. A scanning device connected to a network, comprising:
   a first device which utilized an HTTP protocol and receives a plurality of addresses and a plurality of parameters corresponding to each of said plurality of IP addresses specifying at least a button name for distinguishing text and associated resolution and encoding, said first device reading and encoding an image from a reading unit connected to said network according to a selected button name and associated plurality of parameters;
   a selecting device for selecting said one of said plurality button names; and
   a second device which sends e-mail to the IP address associated with the selected button name with an attached file of said read, encoded image.

2. A scanning device, comprising:
   a reading unit for reading texts;
   a display unit for controlling an operation panel;
   a network controlling unit which is connected to a network for sending/receiving data;
   an HTTP function unit for receiving from a computer connected to said network notification information comprising information relating to text to be read, an encoding system for image data of the text to be read, and an IP address of said computer using a HTTP protocol via said network controlling unit;
   a mail function unit for sending information relating to said text and for sending said image data read as an attachment ail file to said IP address of said computer using a SMTP protocol via said network controlling unit; and
   a device controlling unit for controlling said reading unit, said mail function unit, and said HTTP function unit, said device controlling unit including a data storage unit for storing said notification information and image data read by said reading unit.

3. The scanning device according to claim 2, wherein information relating to said text to be read includes reading resolution, size of paper used for reading, and a type of the text.

4. The scanning device according to claim 2, wherein information about a type of text, among information relating to said text which is sent as mail by said mail function unit via said network controlling unit, is positioned at a header portion of said mail.

5. The scanning device according to claim 2, wherein information displayed on sail display unit is deleted by receiving a command from said computer which has sent said IP address.

6. The scanning device according to claim 2, wherein:
   said HTTP function unit receives different notification information from a plurality of computers and said information relating to text comprises information relating to different types of text; and
   said display unit is capable of displaying at least said different types of text for said plurality of computers having different IP addresses and said reading unit reads said different types of text in response to actuation by an operator of a portion of a display of said display unit said portion identifying said different types of text.

7. The scanning device according to claim 6, wherein said device controlling unit, after said corresponding portion of said display on said display unit showing types of text is actuated, notifies said reading unit of a set of information about said text, including the type thereof, indicated by said displayed portion being actuated plurality of types of texts being stored in said data storage unit.

* * * * *